Patented Oct. 6, 1953

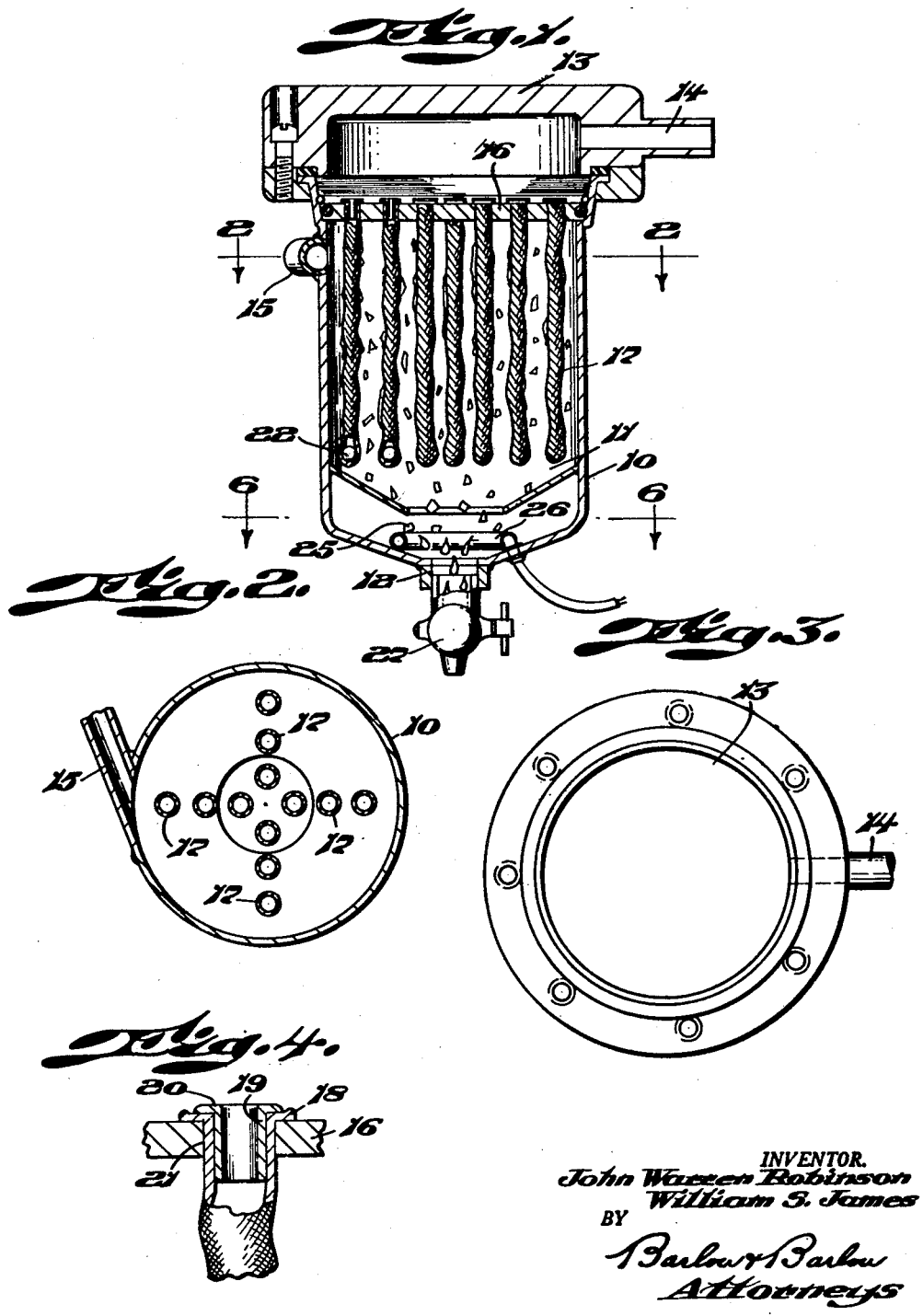

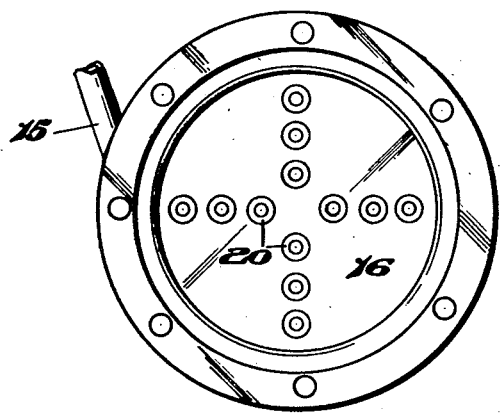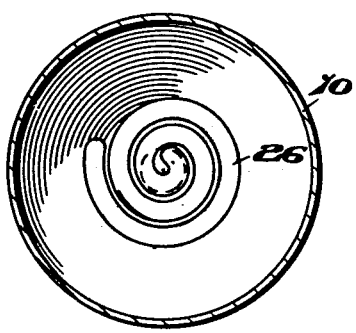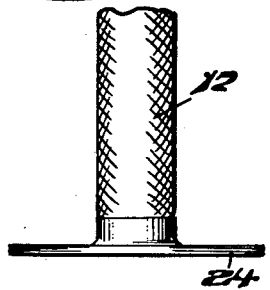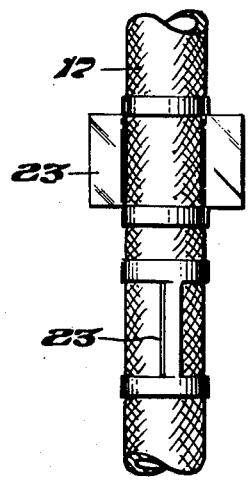

2,654,482

UNITED STATES PATENT OFFICE 2,654,482

FILTER FOR REMOVING ICE CRYSTALS FROM HYDROCARBON LIQUIDS AND THE LIKE

John Warren Robinson, Atlantic Beach, Fla., and William S. James, Providence, R. I., assignors to Fram Corporation, a corporation of Rhode Island Application September 20, 1952, Serial No. 310,621

7 Claims. (Cl. 210—167)

This application is a continuation in part of our application Ser. No. 68,328, filed December 30, 1948, now abandoned, and relates to a filter for liquids for use in climates sufficiently cold so that water in solution will become ice at the temperatures to which the liquids are subjected.

In the operation of the internal combustion engines using hydrocarbons such as kerosene or gasoline as fuel, water is often present in solution in quantities from .005% to .020% and as the water is not mixable with the fuel at low temperatures, it is found that when the engine is operated in low temperatures that the water in the fuel will become ice in the form of crystals which gather upon a filtering surface and provide such a solid that they will obstruct the flow of the fuel. Sometimes the ice crystals will collect upon the screen of the fuel pump or upon bends in the fuel line where the fuel lines are of small cross-sectional area. The crystals which form have a very high unit pressure which causes slight melting and then the pressure disappears and refreezing occurs, and it is found in extremely cold climates that ice very rapidly forms in the fuel lines or upon screens or other such surfaces where the flow of the crystals in the fuel may be slightly retarded.

One of the objects of this invention is to provide for the separation of the solid ice crystals from the liquid fuel and to accumulate them in such a position that the fuel flow will not be retarded.

Another object of this invention is to provide some means for removing the solid ice crystals from the liquid as they are formed, that the surface upon which they are accumulated may remain free.

With these and other objects in view, the invention consists of certain novel features of construction, as will be more fully shown and particularly pointed out in the appended claims.

In the accompanying drawings:

Fig. 1 is a sectional view of a filter formed in accordance with this invention;

Fig. 2 is a sectional view showing the flow of the fuel to the filter;

Fig. 3 is a top plan view of Fig. 1;

Fig. 4 is a sectional view showing the mounting of the filter element;

Fig. 5 is a plan view with the cap removed;

Fig. 6 is a section on line 6—6 of Fig. 1;

Fig. 7 is a fragmental elevation of the lower end of a filter element of modified form;

Fig. 8 is a fragmental elevation of a filter element of a different modified form;

Fig. 9 is a sectional view through a filter element showing the same in dotted lines in collapsed position.

In proceeding with this invention, we provide a pervious tubing which is elastic and treat the tubing with some water and ice repellent chemical such as silicone or a stearate such as barium stearate. This filtering element is suspended in a chamber into which the fuel is passed and from which the fuel is taken after passing through the filter element. Any ice crystals will collect upon the filter element and when they accumulate to such an extent as to provide a rigid ice coating and shut off the flow therethrough, the differential in pressure on the outside and inside of the tube will collapse the tube causing it to break the coating of ice crystals, permitting them to drop to the bottom of the chamber.

Additionally, means may be provided to rock or move the element such as the placing of fins upon the element to respond to the circulatory movement of the fuel to swing the element in its suspended relation or some weighting means may be provided which will cause the element to swing due to the vibration of the engine upon which the filter is mounted. These additionally will cause the ice which accumulates on the element to drop to the bottom of the chamber and permit freedom of flow again of the filtrate through the filter element.

Some heating means may be used to provide sufficient heat to melt the small quantity of ice which is accumulated in the bottom of the chamber so that it may be withdrawn as water, that the chamber need not be of too great a size.

With reference to the drawings, 10 designates a casing in the form of a cup, providing a chamber 11 which has a drainage outlet 12 at its lower end and a closure cap 13 at its upper end, which provides an outlet conduit 14, inlet being provided by a tangential conduit 15 to give a swirling action to the liquid as it enters. Suspended from the plate 16 are a plurality of pervious elastic tubes 17, which are treated with some water or ice repellent chemical such as silicone or a stearate such as barium stearate.

The tube may be formed of any long fiber material which will not absorb water and which when braided or woven into tubular form possesses the quality of assuming a tubular form when fabricated into this form and yet is elastic permitting it to be deformed from the tubular shape under pressure and return to its former shape when the pressure is released. The fibers must also be capable of being treated with a water repellent chemical. The smooth long synthetic fibers such as glass, nylon, casein, teflon, and other fibers having these qualities will be found suitable.

The tubes are suspended so that they will freely swing in the chamber 11. Each tube 17 has its inner area connecting with the outlet 14 so that filtrate which passes through the tubes 17 may be discharged through the outlet 14. The tube 17 may be secured to a plate 16 by the upper edge 18 of the tube being outwardly flared and held in place by a ferrule 19 having a flange 20 to force the tube against the wall of an opening 21 through the plate 16. These tubes each have a weight such as 22 within the tube which may also be provided with some sort of a fin 23 (Fig. 8) extending outwardly from its surface or a plate such as 24 at its lower end, so that the passage of the liquid from the inlet through the chamber to the outlet will by reason of its circulation cause a swinging movement of the tube 17 in the chamber. The weight 22 and fins 23 and 24, although shown separately, may all be combined in each element 17.

If ice should collect upon the outer surface of the tube 16 and block off the flow through the tube, then the pressure between the inlet conduit 15 and the outlet conduit 14 will be such that the pressure differential across the conduits will cause the tube 17 to collapse or assume the position shown in dotted lines in Fig. 9, it being of an elastic resilient nature so that the ice will be broken from the tube by reason of its collapsing, which will be assisted by the swinging movement of the tube in the chamber due to the fins and weight 22, thus causing the ice to drop to the bottom of the chamber and accumulate at the point 25. At this location, a heater 26 may be installed which will supply sufficient heat to melt the small quantity of ice thus formed that it may be drawn off through the valve 27.

We claim:

1. In a filter for removing ice crystals from a liquid hydrocarbon, a chamber for receiving the hydrocarbon and ice crystals, inlet and outlet conduits to and from said chamber, a tubular flexible resilient filtrate permeable element in said chamber between said inlet and outlet conduits with its interior in communication with said outlet conduit, said element being treated with an ice repellent material and self supporting as to its cross section until a substantial pressure differential is reached, when collapsing of said cross section occurs.

2. In a filter as in claim 1 wherein said element is sufficiently elastic to substantially regain its shape after deformation on relief from said pressure differential.

3. In a filter as in claim 1 wherein the outlet conduit is through the top wall of said chamber and said element is suspended from said wall and is unsupported from within the element and sufficiently flexible to rock upon turbulence within said chamber.

4. In a filter as in claim 1 wherein said tubular element is braided glass fibers.

5. In a filter as in claim 1 wherein said tubular element is treated with silicone.

6. In a filter as in claim 1 wherein said tubular element is braided glass fibers, which is treated with silicone.

7. In a filter as in claim 1 wherein said element is provided with fins and said inlet and outlet are so arranged as to provide a flow of liquid in said chamber against said fins.

JOHN WARREN ROBINSON.
WILLIAM S. JAMES.

References Cited in the file of this patent

UNITED STATES PATENTS

| Number | Name | Date |
|---|---|---|
| 1,263,226 | Genter | Apr. 16, 1918 |
| 1,724,436 | Sweetland | Aug. 13, 1929 |
| 2,167,159 | Oliver | July 25, 1939 |
| 2,312,999 | De Langen | Mar. 2, 1943 |
| 2,354,623 | Tietig | July 25, 1944 |
| 2,611,490 | Robinson | Sept. 23, 1952 |